United States Patent [19]

Suzuka

[11] Patent Number: 5,255,038
[45] Date of Patent: Oct. 19, 1993

[54] REMOTE CONTROL APPARATUS OF CAMERA

[75] Inventor: Shinya Suzuka, Tokyo, Japan

[73] Assignee: Asahi Kogaku Kogyo Kabushiki Kaisha, Tokyo, Japan

[21] Appl. No.: 873,719

[22] Filed: Apr. 22, 1992

Related U.S. Application Data

[63] Continuation of Ser. No. 459,655, Jan. 2, 1990, abandoned.

[30] Foreign Application Priority Data

Jan. 11, 1989 [JP] Japan ................................. 1-4199

[51] Int. Cl.⁵ .............................................. G03B 17/38
[52] U.S. Cl. ....................................................... 354/266
[58] Field of Search .................... 354/219, 266, 267.1, 354/268, 269, 295

[56] References Cited

U.S. PATENT DOCUMENTS

| | | | |
|---|---|---|---|
| 4,036,762 | 7/1977 | Troetscher et al. | 455/603 |
| 4,051,496 | 9/1977 | Iida et al. | 354/266 |
| 4,707,127 | 11/1987 | Goedken | 354/266 |

FOREIGN PATENT DOCUMENTS

| | | | |
|---|---|---|---|
| 3422359 | 12/1984 | Fed. Rep. of Germany . | |
| 52-31732 | 6/1975 | Japan | 354/266 |
| 56-161535 | 12/1981 | Japan . | |
| 61-89835 | 6/1986 | Japan . | |
| 62-252297 | 11/1987 | Japan . | |
| 64-88528 | 4/1989 | Japan . | |
| 824141 | 11/1959 | United Kingdom . | |
| 2144864 | 3/1985 | United Kingdom . | |

OTHER PUBLICATIONS

"Neues von der Infrarot-Technik", Funkschau 1975, H. 24, S. 59.

Primary Examiner—Michael L. Gellner
Assistant Examiner—Howard B. Blankenship
Attorney, Agent, or Firm—Sandler Greenblum & Bernstein

[57] ABSTRACT

A remote control apparatus of a camera having a camera body with a finder eye-piece window includes an infrared receiver which is associated with a shutter of a camera body and which has a signal receiving surface, and an infrared transmitter separatable from the infrared receiver. A remote release signal emitted from the infrared transmitter is received by the infrared receiver to release the shutter of the camera body. Mounting means is provided between the infrared receiver and the finder eye-piece window for mounting the signal receiving surface of the receiver to the rear portion of the finder eye-piece window. The remote control apparatus can be applied to either a SLR camera or a compact camera which has a taking lens and a separate finder optical device.

9 Claims, 2 Drawing Sheets

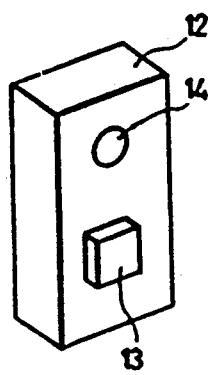
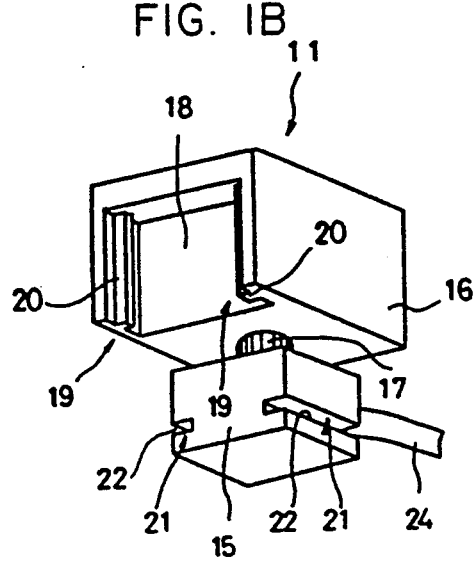
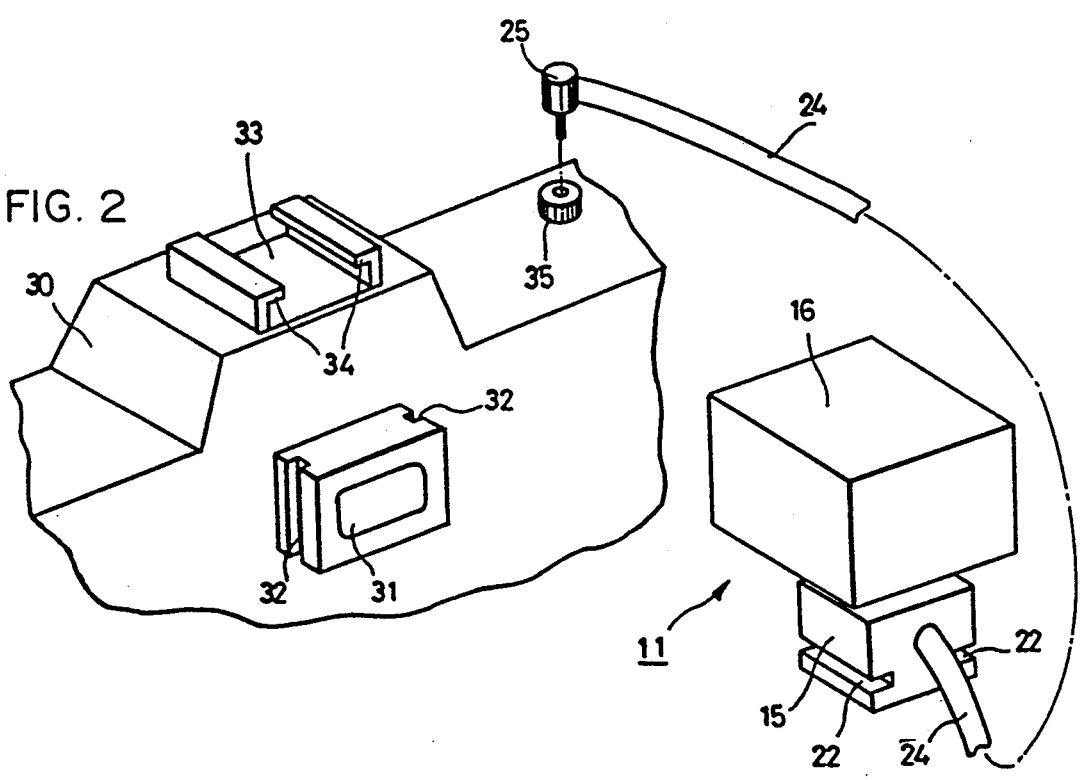

REMOTE CONTROL APPARATUS OF CAMERA

This application is a continuation, of application Ser. No. 07/459,655, filed Jan. 2, 1990, now abandoned.

BACKGROUND OF THE INVENTION

1. Field of the Invention

The present invention relates to a remote control apparatus for controlling the shutter operation of a camera.

2. Description of Related Art

A conventional remote control apparatus of a camera basically has an infrared transmitter and an infrared receiver for transmitting and receiving infrared radiation (remote release signal), respectively. The infrared receiver is usually provided on a camera body associated with an electromagnetic shutter in order to receive the infrared radiation transmitted from the infrared transmitter thereby to release the shutter.

The infrared receiver of the remote control apparatus is usually mounted to a hot shoe of the camera body, so that the direction of the receiving surface of the infrared receiver can be adjusted in accordance with an expected position (direction) of the operator.

Accordingly, in a conventional remote control apparatus, the operator, carrying the infrared transmitter is not intended to be part of the scene to be photographed. Therefore, if the operator should be the subject, it is next to impossible to confirm that the object is within the picture to be taken. This is more serious in a camera, such as a zoom lens camera or a two-focal length camera, in which the focal length of the photographing lens is variable, since the angle of view (field angle) varies in accordance with the change of the focal length.

SUMMARY OF THE INVENTION

The primary object of the present invention is to provide a remote control apparatus with an operator taking mode in which, if the operator is to be the subject, the shutter can not be released when the operator is not in the picture to be taken.

Another object of the present invention is to provide a remote control apparatus with and operator taking mode in which, if the operator is the subject, the shutter can not be released when the operator is not in the picture to be taken and a non-taking mode in which the operator can not be made the subject can be selectively set by the operator.

To achieve the object of the invention mentioned above, according to the present invention, there is provided a remote control apparatus comprising a transmitter which transmits a remote release signal and a separate receiver having a receiving surface, associated with a shutter of a camera body having a finder eye-piece window, the receiver receiving the remote release signal to release the shutter of the camera body, the improvement comprising mounting means between the receiver and the finder eye-piece window for mounting the receiving surface to the rear portion of the finder eye-piece window.

Since the field of view of the finder device corresponds to the angle of view of the photographing optical system, the mounting of the receiving surface to the rear portion of the finder eye-piece window makes it possible for the receiver to receive the remote release signal only when the remote release signal is transmitted from an area within the angle of view, i.e. only when the operator is in the picture to be taken. Namely, the shutter is not released when the operator is not in the picture. This is applicable to a camera having a variable focal length, lens such as a zoom lens camera or a two-focal length lens camera, as long as the the finder field of view varies in accordance with the photographing field of view.

If it is not desired to take a picture of the operator, the receiver is removed from the rear portion of the eye-piece window, so that it can be located on the camera body or in the vicinity thereof to perform as a normal remote control photographing apparatus. When it is desired to locate the receiver on the camera body, the receiver preferably comprises a receiving portion having a receiving surface for the remote release signal and a base which rotatably supports the receiving portion. The base has a mounting portion which can be mounted to a hot shoe of the camera body. The receiving portion has a finder eye-piece window mounting portion which enables the receiving surface to be mounted to the rear portion of the finder eye-piece window. The base is attached to the hot shoe to set a non-operator photographing mode in which the picture of an operator can not be taken, and the receiver is attached to the eye-piece window to set an operator photographing mode in which a picture of an operator can be taken.

BRIEF DESCRIPTION OF THE DRAWINGS

The invention will be described below in detail with reference to the accompanying drawings, in which:

FIGS. 1A and 1B are perspective views of a remote control apparatus of a camera according to an embodiment of the present invention;

FIG. 2 is a perspective view of a remote control apparatus according to the present invention and an associated camera; and, FIGS. 3 and 4 are perspective views of a remote control apparatus attached to and removed from the camera body in an operator photographing mode and an non-operator photographing mode, respectively.

DESCRIPTION OF PREFERRED EMBODIMENTS

Figure 3:
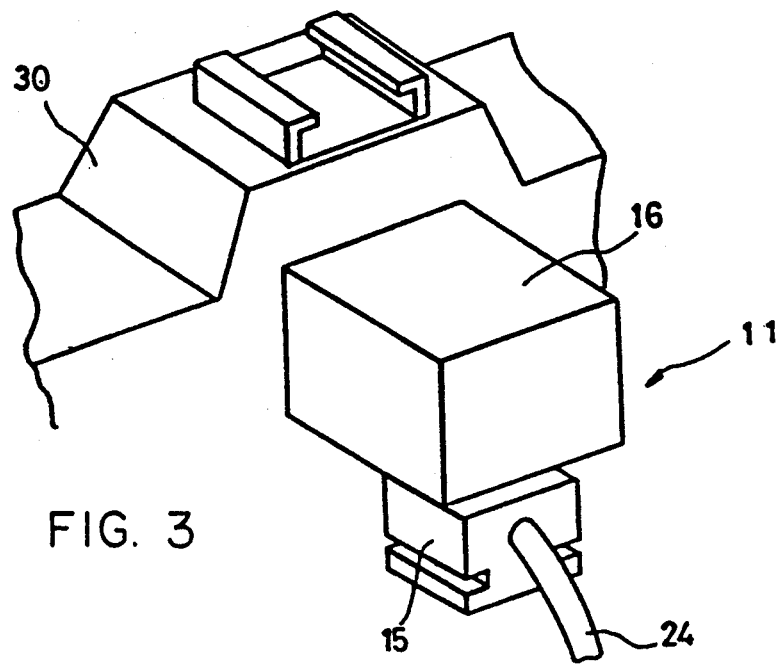

A remote control apparatus of a camera according to the present invention has an improved infrared receiver 11. The infrared transmitter 12 is a conventional transmitter 12 having a remote release button 13 and a transmission window 14 which transmits infrared radiation (remote release signal) when the remote release button 13 is pushed down.

The infrared receiver 11 has a base 15 and an infrared radiation receiving portion 16 which is rotatable about a shaft 17 connected to the base 15. The receiving portion 16 has a signal receiving surface (light receiving surface) 18 and a mounting portion 19 which can be attached to an eye-piece window 31 of a finder device of a single lens reflex (SLR) camera body 30 (FIG. 2). The mounting portion 19 has projections provided on the opposite sides of the signal receiving surface 18 to be slidably fitted in corresponding accessory mounting grooves 32 of the eye-piece window 31 of the finder device. As is well known, a taking lens (not shown) of the SLR camera comprises the finder device.

The base 15 has a mounting portion 21 which can be attached to a hot shoe 33 of the camera body 30. The hot shoe mounting portion 21 has a pair of mounting grooves 22 in which corresponding projections 34 of the hot shoe 33 can be slidably fitted. The mounting grooves 22 and the projections 20, of the infrared receiver 11 extend to be perpendicular to each other. Furthermore, the mounting grooves 22 and the projections 20 are placed so that when the projections 20 are fitted in the associated accessory mounting grooves 32, the mounting grooves 22 do not interfere with the fitting operation, and when the mounting grooves 22 are attached to the associated projections 34, the projections 20 do not interfere with the fitting operation.

The front end of the release cable 24 that projects from the base 15 is provided with a connector terminal 25 which can be connected to a release socket 35 provided on the camera body 30.

When the remote control apparatus according to the present invention is used at in an operator photographing mode, the receiving portion 16 of the infrared receiver 11 is attached to the eye-piece window 31 of the camera body 30 through the mounting portion 19, as shown in FIG. 3. Namely, the projections 20 of the mounting portion 16 are slidably inserted in the corresponding accessory mounting grooves 32 of the eye-piece window 31, so that the receiving surface 18 of the infrared receiver 11 is located behind the eye-piece window 31. The connector terminal 25 of the release cable 24 is connected to the release socket 35 of the camera body 30.

In the operator photographing mode, the remote release signal is provided to the signal receiving surface 18 only through the finder optical system including the eye-piece window 31. The finder optical system can be either part of a photographing optical system as in a single lens reflex camera or an optical system separate from the photographing optical system. The shutter of the camera body 30 can be released through the receiving portion 16 only when the remote release signal is emitted from the infrared transmitter 12 carried by the operator who is within the finder field of view, i.e. within the picture to be taken.

Figure 4:
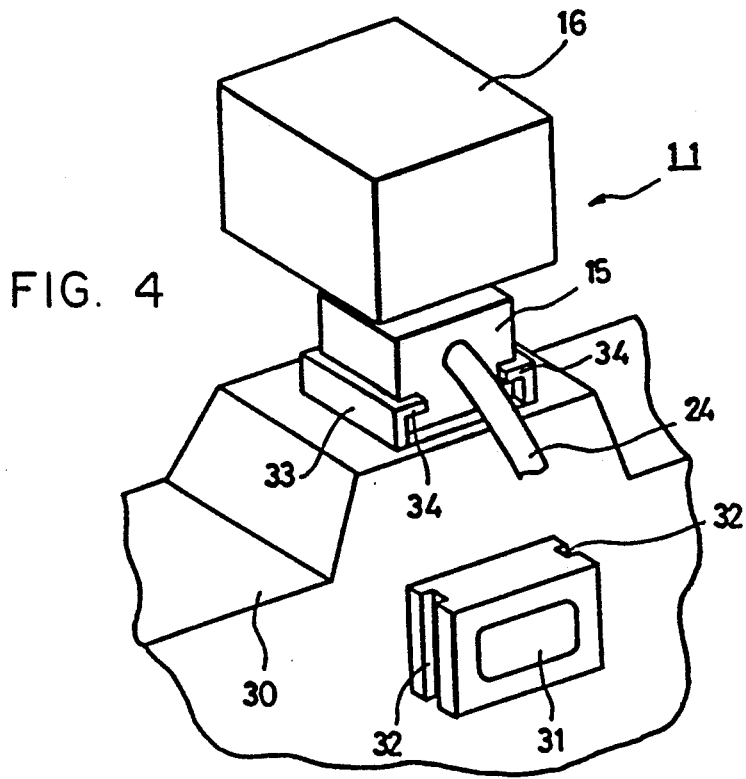

At the non-operator photographing mode, the base 15 of the infrared receiver 11 is attached to the hot shoe 33 of the camera body 30 through the mounting portion 21, as shown in FIG. 4. Namely, the projections 34 of the hot shoe 33 are slidably inserted in the associated mounting grooves 22. In the position shown in FIG. 4, the receiving surface 18 of the infrared receiver 11 can receive the remote release signal from a wider angle range. Furthermore, since the infrared receiver 11 is rotatable about the shaft 17, the direction of the receiving surface 18 can be adjusted in accordance with an expected position of the operator to perform a normal remote photographing operation.

As can be understood from the above-discussion, according to the present invention, since the remote control apparatus of a camera has an operator taking mode mounting means for mounting the signal receiving surface of the infrared receiver, and the signal receiving surface is attached to the rear portion of the finder eye-piece window of the camera body, the infrared receiver can receive the remote release signal only when the remote release signal is emitted within the finder filed of view. Namely, when the operator is not within the picture to be taken, the shutter is not released, and accordingly, a picture of the operator can be certainly taken.

Furthermore, since the infrared receiver includes a signal receiving portion which has a mounting portion for mounting the same to the rear portion of the finder eye-piece window and a base which rotatably supports the signal receiving portion and which has a mounting portion for mounting the base to the hot shoe of the camera body, the operator photographing mode and the non-operator and photographing mode can be easily and selectively set by attaching the infrared receiver to the hot shoe or to the eye-piece window.

It is noted that the present invention can be applied to either a SLR camera or a compact camera which has a taking lens and a separate finder optical system.

I claim:

1. A remote control apparatus of a camera having a camera body with a finder eye-piece window and a mounting member, comprising, a receiver which is adapted to control a shutter of a camera body and which has a signal receiving surface and a transmitter which is adapted to be separated from the receiver, so that a remote release signal emitted from the transmitter can be received by the receiver to release the shutter of the camera body, said apparatus comprising, first mounting means connected to the receiver and adapted to engage with the finder eye-piece window for detachably mounting the signal receiving surface of the receiver to a rear portion of the finder eye-piece window for receiving a signal emitted from the transmitter through a finder optical system of the camera body, and second mounting means connected to the receiver and adapted to engage the mounting member of the camera body to detachably mount the receiver to the camera body.

2. The remote control apparatus of a camera according to claim 1, wherein said signal receiving surface is rotatable with respect to said second mounting means when said second mounting means is engaged with the mounting member of the camera body.

3. A remote control apparatus of a camera according to claim 1, wherein said transmitter is an infrared transmitter which transmits infrared radiation and wherein said receiver is an infrared receiver which receives infrared radiation emitted from the infrared transmitter.

4. A remote control apparatus of a camera having a camera body and a finder eye-piece window, comprising a receiver which is adapted to control a shutter of a camera body and which has a signal receiving surface and a transmitter which is adapted to be separated from the receiver, so that a remote release signal emitted from the transmitter can be received by the receiver to release the shutter of the camera body, said apparatus comprising mounting means connected to the receiver and adapted to engage with the finder eye-piece window for mounting the signal receiving surface of the receiver to a rear portion of the finder eye-piece window, wherein said receiver comprises a signal receiving portion having said signal receiving surface for receiving the remote release signal emitted from said transmitter and a base which rotatably supports said signal receiving portion so as to change the orientation of said signal receiving surface, wherein said base has a mounting portion for mounting said base to a hot shoe of a camera.

5. A remote control apparatus of a camera according to claim 4, wherein said signal receiving portion has a mounting portion for mounting said signal receiving surface to the rear portion of the finder eye-piece window.

6. A remote control apparatus of a camera according to claim 5, wherein said mounting portion of said signal receiving portion has projections and wherein the finder eye-piece window has corresponding mounting grooves in which said projections of said mounting portion of said signal receiving portion can be slidably inserted.

7. A remote control apparatus of a camera according to claim 4, wherein said mounting portion of said base has mounting grooves and wherein said hot shoe has corresponding projections which can be slidably inserted in said mounting grooves of said mounting portion of said base.

8. A receiver of a remote control apparatus of a camera, adapted to be attached to a camera body and adapted to receive a signal from a remotely located signal transmitter for actuating the camera, said receiver comprising a receiver body including a first mounting portion which can be attached to a finder eye-piece window and a second mounting portion which can be attached to a hot shoe of the camera body, said first and second mounting portions comprising means for rotation with respect to each other, said first mounting portion comprising means for insuring that, when the camera is actuated, a transmitter cooperating with said receiver is positioned within a photographic image area of the camera.

9. A receiver of a remote control apparatus for a camera, adapted to be attached to a camera body, said receiver comprising a receiver body including a first mounting portion which can be attached to a finder eye-piece window, and a second mounting portion which can be attached to a hot shoe of the camera body, said first and second mounting portions comprising means for rotation with respect to each other, said first and second mounting portions comprising means for selectively mounting said receiver body to the camera body.

* * * * *